(12) United States Patent
Lee

(10) Patent No.: US 7,131,019 B2
(45) Date of Patent: Oct. 31, 2006

(54) METHOD OF MANAGING POWER OF CONTROL BOX

(75) Inventor: Chun Liang Lee, Taipei (TW)

(73) Assignee: Inventec Corporation (TW)

( * ) Notice: Subject to any disclaimer, the term of this patent is extended or adjusted under 35 U.S.C. 154(b) by 493 days.

(21) Appl. No.: 10/656,293

(22) Filed: Sep. 8, 2003

(65) Prior Publication Data
US 2005/0055587 A1    Mar. 10, 2005

(51) Int. Cl.
G06F 1/26 (2006.01)
G06F 1/32 (2006.01)
(52) U.S. Cl. ...................... 713/340; 713/320
(58) Field of Classification Search ............. 713/340, 713/320
See application file for complete search history.

(56) References Cited
U.S. PATENT DOCUMENTS 5,842,027 A * 11/1998 Oprescu et al. ............ 713/300
6,785,827 B1 * 8/2004 Layton et al. .............. 713/300
6,957,353 B1 * 10/2005 Bresniker et al. ........... 713/320
6,968,470 B1 * 11/2005 Larson et al. .............. 713/340

* cited by examiner

Primary Examiner—Thuan Du
(74) Attorney, Agent, or Firm—Bacon & Thomas PLLC

(57) ABSTRACT

The present invention is to provide a method of managing power of a control box which, when powered on, causes a control module to perform the steps of running a power on management procedure to set a power on mode of each of a plurality of blade servers installed in the control box; measuring power consumed by the blade servers running in the power on mode; measuring power of a power supply; running a power consumption estimation procedure to determine whether the power of the power supply is larger than the power consumed by the blade servers, and determining whether a subsequent action should be continued by the control module based on the estimation.

10 Claims, 2 Drawing Sheets

METHOD OF MANAGING POWER OF CONTROL BOX

FIELD OF THE INVENTION

The present invention relates to power management and more particularly to a method of effectively managing power of a control box in a power on process.

BACKGROUND OF THE INVENTION

A blade server is a flat server and comprises only a central processing unit (CPU) and a system controller. The blade server can be effectively incorporated into a large data center. A small control box is able to store ten or more vertically disposed blade servers. The control box comprises an intelligent system for providing relevant information to an internal resource store and for separating network based blade server resource from specific tasks or application programs being run on the blade servers. As a result, the use of the blade servers in the control box has a great flexibility.

The blade servers can be interconnected by means of a universal switch and can share a common element (e.g., integrated switch). In addition to the blade servers, the control box further comprises an internal control module for managing all available system resources in any time and assigning tasks to a specific blade server. While the above purpose can be achieved by several conventional servers, the employment of blade servers provides advantages of having an integrated network architecture, elements for supporting hot plug, and being capable of managing the architecture. All of the above advantages form a flexible platform for operation, make a future expansion easy and a high utilization possible, and reduce the cost of buying a server.

Many companies and internet service providers (ISPs) use several tens or hundreds low cost blade servers for meeting the needs of accessing the Internet. A blade server only occupies the space of a control box unit in a data center and has height of 1.75" complying with a standard set by the art. The blade server is also called an IU server. The blade server can be packed in the control box as books arranged on a bookshelf. More CPUs are arranged in a single control box so as to establish a high density operating environment. This is because the CPU of blade server can consume less power and generate less heat as compared to the CPU of a well known server. Moreover, a heat dissipating and power system can be shared. Thus, a high efficiency still can be achieved in such small, operation-based architecture. Also, each control box has a set of network cable and power cord for facilitating cable and cord management. Moreover, all blade servers and other components in the control box can be replaced if such need arises. As an end, the maintenance of the whole platform is made easy.

Additionally, the most important characteristics of the blade server are high reliability and high expansibility. This is because there are many blade servers in the control box. The blade server itself has a backup capability in operation. Also, the control box can provide a high utilization because it can support hot plug of the blade server and system elements. Another blade server can immediately replace a malfunctioned one without interrupting service. Moreover, the blade servers in the control box can be grouped so that a user can set levels of backup depending on needs. For example, insertion of more blade servers into the control box can improve the total performance of the control box and optimize resource distribution.

In view of the above, the blade server can bring a great profit in a lowest potential risk. In other words, the blade server has the following benefits: (1) It has a high expansibility and reliability because the control box can support hot plug of the blade server and system elements. (2) Low power consumption and shared heat dissipating device. (3) Compactness. (4) It can separate system resource from specific tasks or application programs being run. (5) Low cost.

Thus, it is desirable for a distributed blade server arrangement to provide following features as improvements of the blade server continue. These features comprise dynamically providing a powerful operational capability to each application program as required, and a more advanced, simple management for coping with unexpected load variation and peak load, increasing efficiency of system manager, decreasing the possibility of human errors, effectively operating equipment, lowering power consumption, determining whether a power supply can provide a sufficient power to the whole system in any of different combinations of blade servers, controlling the switching of each blade server for optimizing power supply, and prolonging a useful life of the power supply.

SUMMARY OF THE INVENTION

One object of the present invention is to provide in a control box including at least one power supply and a control module having a power on management procedure and a power consumption estimation procedure, a method of managing power of the control box which, when powered on, causes the control module to perform the steps of (a) running the power on management procedure to set a power on mode of each of a plurality of blade servers installed in the control box; (b) measuring power consumed by the blade servers running in the power on mode; (c) measuring power of the power supply; (d) running the power consumption estimation procedure to determine whether the power of the power supply is larger than the power consumed by the blade servers, and (e) determining whether a subsequent action should be continued by the control module based on the estimation.

In one aspect of the present invention, in response to determining that the power of the power supply is less than the power consumed by the blade servers, the control module performs the steps of (f) determining whether there is a backup power supply in the control box, and (g) running the power consumption estimation procedure to determine whether a total available power of the power supply and the backup power supply is larger than the power consumed by the blade servers in the power on if the determination in the step (f) is positive so that the control module is operative to continue or stop the subsequent action based on the determination in the step (g).

In another aspect of the present invention, in response to finishing the power on, reside the control module in the control box for monitoring whether there is an insertion of the blade servers into the control box or a removal of the same from the control box and an activation of the blade servers in a standby mode, and measuring the power consumed by the blade servers; and run the power consumption estimation procedure to determine whether the power consumed by the blade servers is larger than the total available power so that the control module is operative to continue or stop the subsequent action based thereon.

DETAILED DESCRIPTION OF THE PREFERRED EMBODIMENTS

Figure 1:
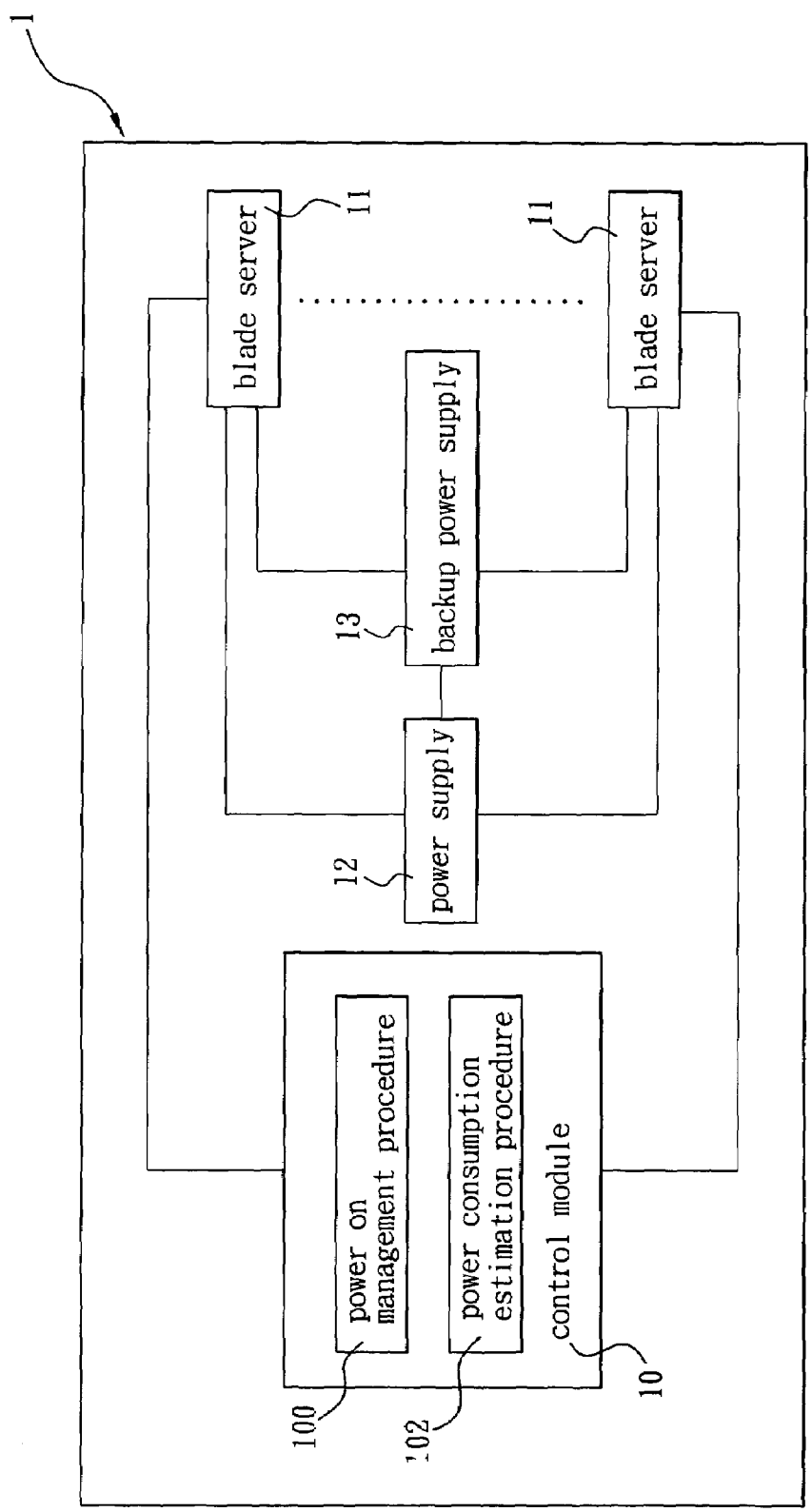
FIG. 1 is a block diagram of components including blade servers and others installed in a control box according to the invention.
Figure 2:
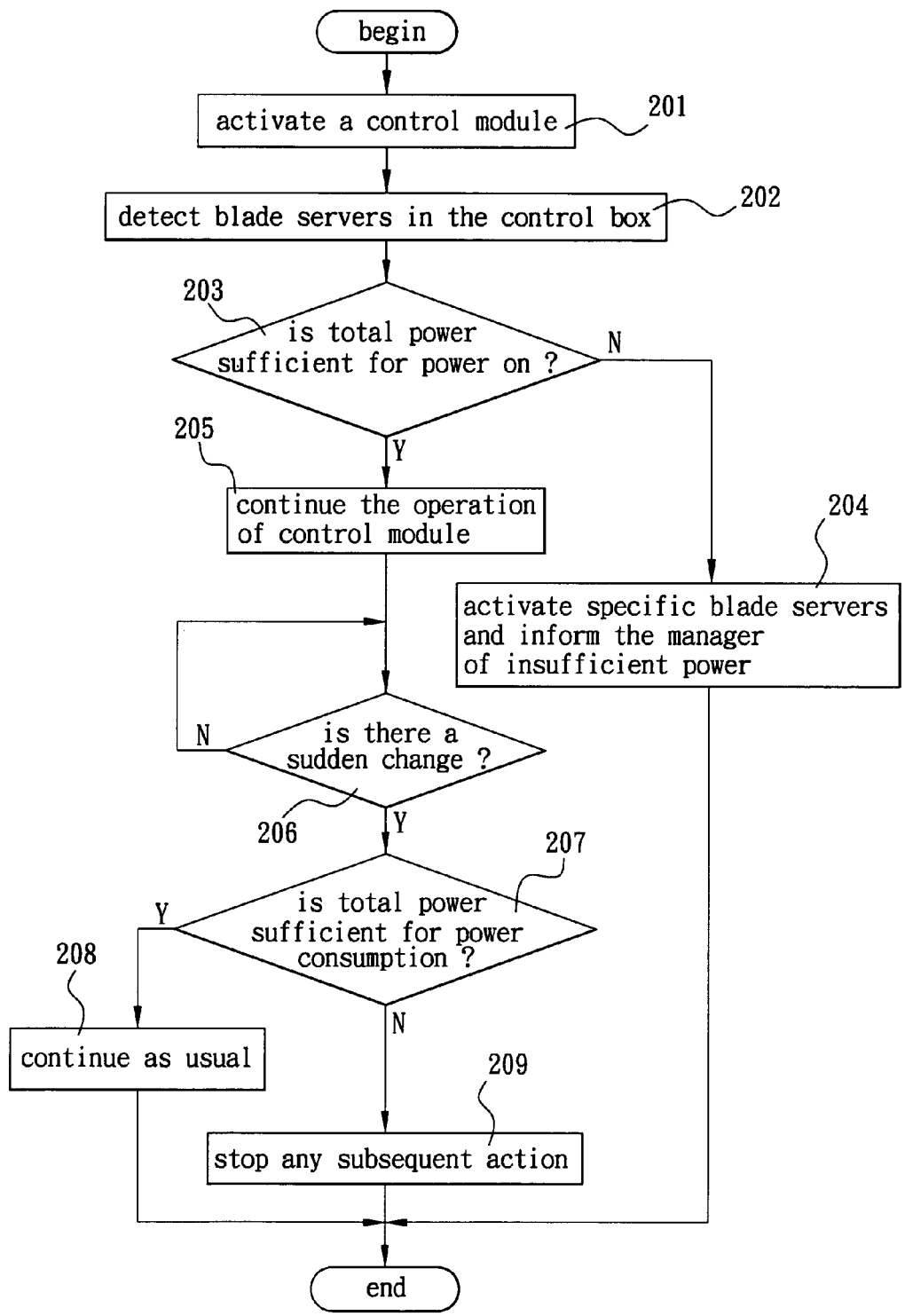
FIG. 2 is a flow chart showing a sequence of method steps performed by a control module of FIG. 1.

Referring to FIG. 1 and FIG. 2, a method of managing power of a control box 1 in accordance with the invention is illustrated. The control box 1 comprises at least one power supply 12 and a control module 10 including a power on management procedure 100 and a power consumption estimation procedure 102. The control module 10 can run the power on management procedure 100 to set a power on mode of each of a plurality of blade servers 11 installed in the control box 1 when the control box 1 is activated. The control module 10 can measure power consumed by each blade server 11 when the blade servers 11 run in the power on mode as set by the power on management procedure 100 and can measure power of the power supply 12. Next, the control module 10 can run the power consumption estimation procedure 102 to estimate the power of the power supply 12 in order to determine whether the power supply 12 is capable of supplying sufficient power when the control box 1 is activated. The control module 10 then determines whether a subsequent power on process should be continued or stopped based on the estimation of the power consumption estimation procedure 102. A warning about insufficient power for power on is issued for informing a manager of the control box 1 of the same if the subsequent power on process is stopped after the determination. As an end, it is impossible of operating the system (i.e., the control box 1) in an unstable condition caused by insufficient power since a warning has been issued in advance.

In the invention, the control box 1 further comprises at least one backup power supply 13. In a case of the control module 10 has determined that the power of the power supply 12 is less than power consumed in the power on process by utilizing the power consumption estimation procedure 102, the control module 10 then determines whether there is a backup power supply 13 in the control box 1. If yes (i.e., there is a backup power supply 13 in the control box 1), the control module 10 further runs the power consumption estimation procedure 102 to estimate whether a total available power of the power supply 12 and the backup power supply 13 is sufficient for the power on process. If it is sufficient, continue a subsequent power on process. Otherwise, a warning about insufficient power for power on is issued to inform the manager of the control box 1 and stop the subsequent power on process. As a result, it is impossible of operating the control box 1 in an unstable condition caused by insufficient power since the manager of the control box 1 is fully aware of the current power supply condition.

In a preferred embodiment of the invention, in a case of a power consumption exceeded the total available power after activating the control box 1, the power consumption estimation procedure 102 is run to estimate an optimum power on condition without activating the backup power supply 13 in which the type of the enabled blade servers 11 and the optimum number of the enabled blade servers 11 can be set in the optimum power on condition. Next, activate the blade servers 11 and inform the manager of the warning of insufficient power supplied by the power supply 12 based on the optimum power on condition. This can prevent the control box 1 from activating the blade servers 11 based on the power on mode of each blade server 11 set by the power on management procedure 100. Otherwise, it may cause an unstable operating condition due to insufficient power.

In another preferred embodiment of the invention, in a case of a power on power consumption exceeded the total available power after, the backup power supply 13 is activated and the power consumption estimation procedure 102 is run to estimate the type of the blade servers 11 and the optimum number of blade servers 11 that can be enabled by the total available power when the system is operated in an optimum power on condition. Next, activate the blade servers 11 and inform the manager of the warning of insufficient power since there is no additional backup power supply available in the control box 1.

It is designed that a plurality of blade servers 11 of the same type or different types can be readily installed in the control box 1. Thus, the configuration of the control box 1 can be changed if the blade servers 11 in the control box 1 are activated in a standby mode for increasing the operational capability of the control box 1 or the blade servers 11 are removed from the control box 1 for maintenance. As such, the control module 10 is resident in the control box 1 after the power on process for reflecting the current state (i.e., any sudden power variation) in a simultaneous, effective manner. As a result, it is possible of monitoring and being aware of the current state of the control box 1.

The power consumption of the control box 1 in the power on process may change when the current state changes, i.e., occurred a sudden power variation. For preventing the control box 1 from shutting down abnormally, the current operation in the control box 1 from interrupting, and data being operated in the blade servers 11 from crashing all due to power insufficiency, a still another preferred embodiment of the invention is provided. In the embodiment, the control module 10 runs the power consumption estimation procedure 102 to estimate whether the power consumption of the control box 1 has exceeded the total available power thereof after finishing the power on process. If yes, the control module 10 stops the addition of any new hardware immediately, stops a subsequent process, and issues a warning about insufficient power to the manager's computer. As such, the manager can perform an action immediately for continuing the operation of the control box 1 when the manager is aware of the warning. The action is that, for example, add the number of the power supply 12 or the backup power supply 13 for increasing the total available power or disable one or more blade servers 11 of the same type or different types for decreasing power consumption to a level below the total available power.

Referring to FIG. 2 in conjunction with FIG. 1, there is shown a process according to the invention. The process is done by the control module 10 for determining whether the power consumption of the control box 1 has exceeded the total available power after powering on. Steps of the process will now be described in detail below. In step 201, activate the control module 10. In step 202, the control module 10 runs the power on management procedure 100 and the power consumption estimation procedure 102 to detect the blade servers 11 installed in the control box 1 for measuring the power consumption of the blade servers 11 operated in a power on mode set by the power on management procedure 100, the power of the power supply 12, and a total available power of the power supply 12 and the backup power supply 13. In step 203, run the power consumption estimation procedure 102 to compare the total available power with the power consumption in power on (i.e., determine whether the power consumption in power on is below the total available power). If yes, the process jumps to step 205. Otherwise, the process goes to step 204. In step 204, the power consumption estimation procedure 102 estimates an optimum activation state based on the total available power. Next, activate the specific blade servers 11 based on the optimum activation state and inform the manager of the insufficiency of power prior to ending the process. In step 205, continue to operate the control module 10 for causing it to reside in the control box 1 for monitoring. In step 206, the control module 10 detects whether one of the following events is occurred in which the power consumption is changed accordingly. These events comprise insertion of the blade servers 11 of the same type or different types into the control box 1, activation of other blade servers 11 in the control box 1, and removal of the blade servers 11 from the control box 1. If any of such events occurs, the process goes to step 207. Otherwise, the process loops back to itself for continuation. In step 207, determine whether the power consumption is less than the total available power. If yes, the process goes to step 208. Otherwise, the process jumps to step 209. In step 208, continue as usual prior to ending the process. In step 209, the control module 10 stops any subsequent action and issues a warning about insufficient power for power on to the manager prior to ending the process.

Thus, in a case of the power consumption of the control box 1 is larger than the total available power, halt any subsequent action for preventing the control box 1 from stopping its operation and avoiding the crash of data being operated in the blade servers 11 both due to power insufficiency.

Following is a detailed description of the operation of the power consumption estimation procedure 102 by referring to an assumed case. The control module 10 runs the power on management procedure 100 and the power consumption estimation procedure 102 to obtain the following information: (1) Blade servers 11 of types A and B are installed in the control box 1. (2) Both blade servers 11 of types A and B can be set in a full speed mode or standby mode. (3) Power consumption of the blade servers 11 of type A in the full speed mode is $S_1$ and power consumption of the blade servers 11 of type A in the standby mode is $S_1'$. (4) Power consumption of the blade servers 11 of type B in the full speed mode is $S_2$ and power consumption of the blade servers 11 of type B in the standby mode is $S_2'$. (5) The number of the blade servers 11 of type A in the control box 1 is $M_1$ in which the number of the blade servers 11 of type A in the full speed mode is $m_1$ and the number of the blade servers 11 of type A in the standby mode is $M_1-m_1$. (6) The number of the blade servers 11 of type B in the control box 1 is $M_2$ in which the number of the blade servers 11 of type B in the full speed mode is $m_2$ and the number of the blade servers 11 of type B in the standby mode is $M_2-m_2$. (7) The number of the power supply 12 is $C_1$. (8) The number of the backup power supply 13 is $C_2$. (9) Power of each of the power supply 12 and the backup power supply 13 is P. (10) Power consumption of the control module 10 is E after the control box 1 has finished the power on process.

The equation approximately calculating a power consumption in the power on is as follows:

$$Px(C_1+C_2) \geqq (S_1 \times m_1)+(S_1' \times (M_1-m_1))+(S_2 \times m_2)+(S_2' \times (M_2-m_2))+E$$

The result of the calculation as done by the power on management procedure 100 can determine whether the power consumption in power on is less than the total available power and can be used an basis for continuing any subsequent action or not.

In a case that there are N blade servers 11 of types A and B, power of each power supply 12 is $P_1$, and power of each backup power supply 13 is $P_2$, the above equation can be rewritten as follows:

$$(P_1 \times C_1 + P_2 \times C_2) \geqq (S_1 \times m_1)+(S_1' \times (M_1-m_1))+(S_2 \times m_2)+ \\ (S_2' \times (M_2-m_2))+(S_3 \times m_3)+(S_3' \times (M_3-m_3)) \ldots \\ +(S_n \times m_n)+(S_n' \times (M_n-m_n))+E$$

In view of the above, the invention can precisely determine whether the power consumption in power on is less than the total available power irrespective of the number of activated blade servers 11 of any type in the control box 1. As an end, the control box 1 can be activated in a stable condition.

While the invention has been described by means of specific embodiments, numerous modifications and variations could be made thereto by those skilled in the art without departing from the scope and spirit of the invention set forth in the claims.

What is claimed is:

1. In a control box including at least one power supply and a control module having a power on management procedure and a power consumption estimation procedure, a method of managing power of the control box which, when powered on, causes the control module to perform the steps of:
   (a) running the power on management procedure to set a power on mode of each of a plurality of blade severs installed in the control box;
   (b) measuring power consumed by the blade servers running in the power on mode;
   (c) measuring power of the power supply;
   (d) running the power consumption estimation procedure to determine whether the power of the power supply is larger than the power consumed by the blade servers, and
   (e) determining whether a subsequent action should be continued by the control module based on the estimation;
   wherein
   the power consumption of each blade server in a full speed mode is $S_1, S_2, \ldots,$ or $S_n$,
   the power consumption of each blade server in the standby mode is $S_1', S_2', \ldots,$ or $S_n'$,
   the number of each of the blade servers in the control box is $M_1, M_2, \ldots,$ or $M_n$,
   the number of each of the blade servers in the full speed mode is $m_1, m_2, \ldots,$ or $m_n$,
   the number of each of the blade servers in the standby mode is $M_1-m_1, M_2-m_2, \ldots,$ or $M_n-m_n$,
   the number of the power supply is $C_1$,
   the number of the backup power supply is $C_2$,
   the power of each of the power supply is $P_1$,
   the power of each of the backup power supply is $P_2$, and
   the power consumption of the control module is E after the control box has finished the power on so that an equation approximately calculating the power consumption in the power on is:

$$(P_1 \times C_1 + P_2 \times C_2) \geq (S_1 \times m_1) + (S_1' \times (M_1 - m_1)) + (S_2 \times m_2) + (S_2' \times (M_2 - m_2)) + (S_3 \times m_3) + (S_3' \times (M_3 - m_3)) \ldots + (S_n \times m_n) + (S_n' \times (M_n - m_n)) + E.$$

2. The method of claim 1, further comprising the step of continuing the subsequent action if the power of the power supply is less than the power consumed by the blade servers as determined in the step (d).

3. The method of claim 1, further comprising the steps of stopping the subsequent action and issuing a warning of insufficient power for the power on if the power of the power supply is less than the power consumed by the blade servers as determined in the step (d).

4. The method of claim 1, wherein the control box further comprises at least one backup power supply and in response to determining that the power of the power supply is less than the power consumed by the blade servers, the control module performs the steps of:

(f) determining whether a backup power supply is currently disposed in the control box;

(g) running the power consumption estimation procedure to determine whether a total available power of the power supply and the backup power supply is larger than the power consumed by the blade servers in the power on if the determination in the step (f) is positive, and (h) continuing the subsequent action if the total available power is larger than the power consumed by the blade servers as determined in the step (g).

5. The method of claim 4, further comprising the steps of stopping the subsequent action and issuing a warning of insufficient power for the power on if the total available power isles than the power consumed by the blade servers as determined in the step (g).

6. The method of claim 4, wherein in response to determining that the total available power is less than the power consumed by the blade servers, the control module, without the activation of the backup power supply, performs the steps of (i) running the power consumption estimation procedure to estimate an optimum power on condition including types of the blade servers to be activated and an optimum number of the blade servers to be activated;

(j) activating the blade servers estimated in the step (i), and (k) informing a manager of the warning of insufficient power supplied by the power supply.

7. The method of claim 4, wherein in response to determining that the total available power is less than the power consumed by the blade servers, the control module, with the activation of the backup power supply, performs the steps of:

(l) running the power consumption estimation procedure to estimate an optimum power on condition including types of the blade servers to be activated and an optimum number of the blade servers to be activated by the total available power;

(m) activating the blade servers estimated in the step (l), and (n) informing a manager of the warning of insufficient power supplied by the power supply and the backup power supply.

8. The method of claim 1, wherein in response to finishing the power on, the control module monitors whether there is an insertion of a blade server into the control box or a removal of a blade server from the control box or an activation of a blade server in a standby mode, and the control module measures the power consumed by the blade servers; and the power consumption estimation procedure is run to determine whether the power consumed by the blade servers is larger than the total available power so that the control module is operative to stop an addition of a new hardware, stop the subsequent process, and issue a warning of insufficient power for the power on to a manager's computer if the power consumed by the blade servers is larger than the total available power.

9. The method of claim 1, further comprising the steps of:

(o) activating the control module (p) running the power on management procedure and the power consumption estimation procedure to detect the blade servers in the control box for measuring the power consumption of the blade servers operated in the power on mode, the power of the power supply, and the total available power of the power supply and a backup power supply;

(q) running the power consumption estimation procedure to compare the total available power with the power consumption of the blade servers in the power on;

(r) running the power consumption estimation procedure to estimate an optimum activation state based on the total available power if the total available power isles than the power consumption of the blade servers in the power on as determined in the step (q);

(s) activating the blade servers based on the optimum activation state prior to informing a manager of a warning of insufficient power.

10. The method of claim 1, wherein responsive to determining that the power of the power supply is larger than the power consumed by the blade servers, the control module continues the subsequent action, monitors the control box, and performs the steps of:

(t) detecting whether there is an insertion of the blade servers of the same type or different types into the control box, an activation of the remaining blade servers, and a removal of the blade servers from the control box;

(u) measuring the power consumed by the blade servers, and (v) running the power consumption estimation procedure to determine whether the power consumed by the blade servers is larger than the total available power so that the control module is operative to stop the subsequent process and issue a warning of insufficient power for the power on the power consumed by the blade servers is larger than the total available power.

* * * * *